United States Patent [19]

Masel

[11] Patent Number: 4,831,374

[45] Date of Patent: May 16, 1989

[54] ELECTRIC LOCK SYSTEM

[76] Inventor: Barry Masel, 43-19 57th St., Woodside, N.Y. 11377

[21] Appl. No.: 474,876

[22] Filed: Mar. 14, 1983

[51] Int. Cl.⁴ ...................... G08B 26/00; E05B 45/06; H04M 11/04

[52] U.S. Cl. .............................. 340/825.310; 340/542

[58] Field of Search .......... 340/825.31, 286 R, 825.32, 340/825.34, 825.54, 542, 531, 825.06; 235/382, 382.5

[56] References Cited

U.S. PATENT DOCUMENTS

| | | | |
|---|---|---|---|
| 3,969,584 | 7/1976 | Miller et al. | 340/542 |
| 4,148,012 | 4/1979 | Baump et al. | 340/825.32 |
| 4,275,385 | 6/1981 | White | 340/525 |
| 4,283,710 | 8/1981 | Genest et al. | 255/382.5 |
| 4,415,893 | 11/1983 | Roland | 340/825.31 |
| 4,427,974 | 1/1984 | Sheahan | 340/825.06 |
| 4,445,214 | 4/1984 | Reynolds et al. | 340/825.5 |
| 4,468,655 | 8/1984 | Iwata | 340/825.54 |

OTHER PUBLICATIONS

Intel 8048/8035L/8748-6/8035 Single Componen 8-bit Microcomputer Specification Sheets 6-9, 6-10, 6-11, 1976.

*Primary Examiner*—Donald J. Yosko

*Attorney, Agent, or Firm*—Amster, Rothstein & Ebenstein

[57] ABSTRACT

An electronic lock system includes a lock which is selectively lockable and unlockable in response to an input signal; and buffer means for (1) receiving user commands and generating the input signal only in response to one or more preselected user commands, (2) identifying certain parameters incident to the locking or unlocking of said lock and (3) transmitting said parameters. A microprocessor includes a memory coupled to the buffer means for recording the parameters, and a central processor selectively interrogates the microprocessor and records the parameters. An interface is coupled between the microprocessor and the central processor and transmits the parameters from the microprocessor memory to the central processor in response to the interrogation.

8 Claims, 5 Drawing Sheets

FIG. 8
MODEM ANALOG SECTION
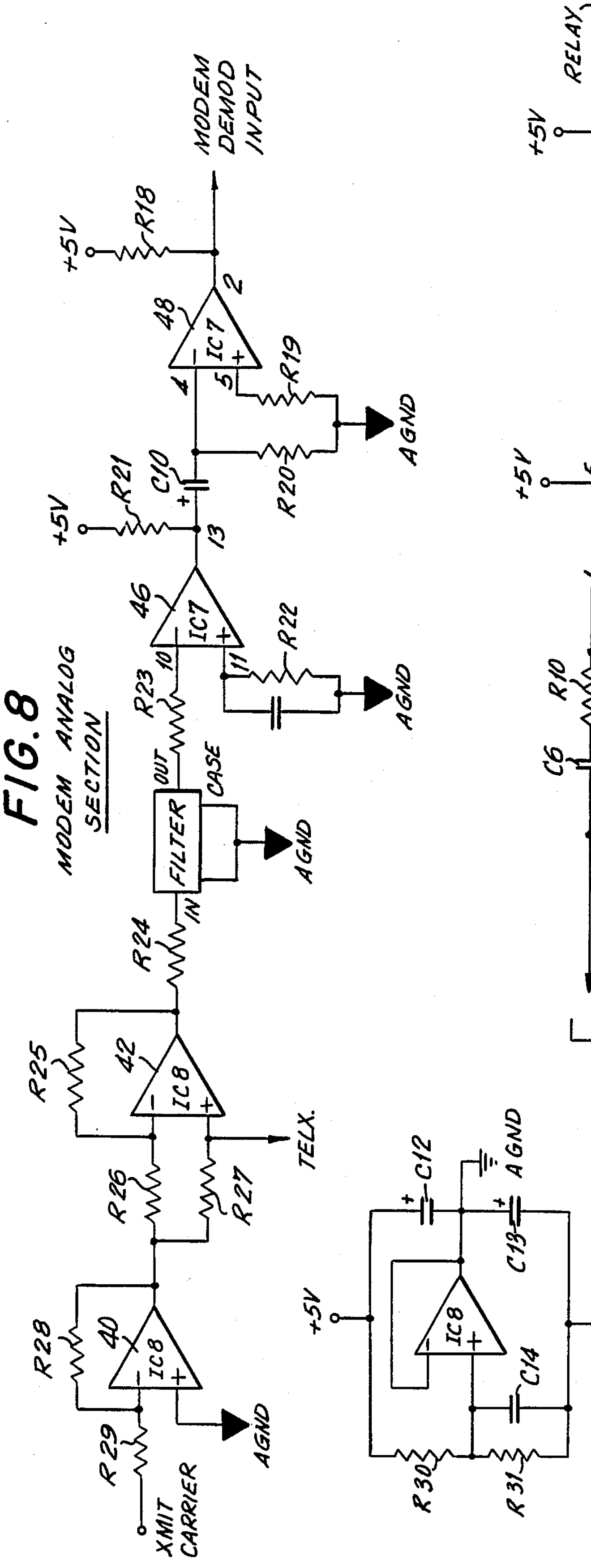
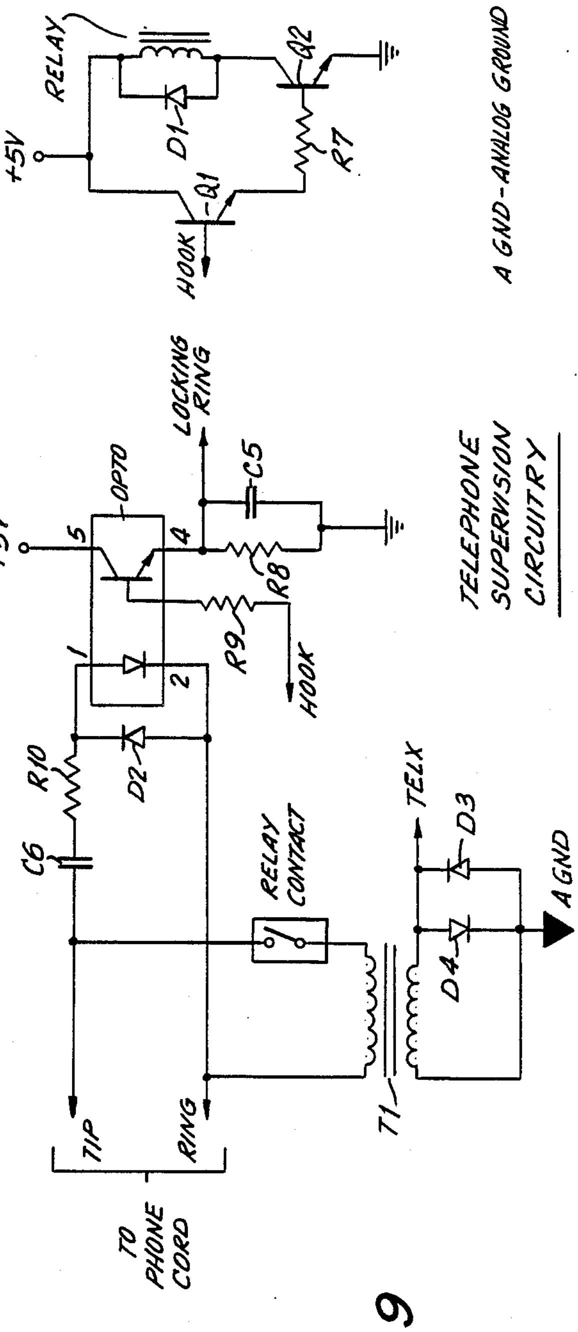
TELEPHONE SUPERVISION CIRCUITRY
FIG. 9

ELECTRIC LOCK SYSTEM

BACKGROUND OF THE INVENTION

The present invention relates in general to an electric lock system, and in particular to an electric lock system in which a central processor is capable of selectively interrogating remote lock locations for the purpose of recording certain parameters of the locking operation.

SUMMARY OF THE INVENTION

The security requirements of modern office buildings, factories and similar facilities are extensive. Such facilities often have several geographically remote buildings, rooms, floors or laboratories, any one or more of which may require a secure lock, and may require the capability of recording and reporting lock opening and closing times, identifications of the person opening or closing the lock and other information.

Current locking mechanism generally consist of mechanical and electromechanical systems which monitor the activities of a particular lock, and genrate hard copy reports of desired parameters. These systems suffer from the requirement of a high degree of manual handling of hard copy reports; delays caused by mailing such reports; the need for manual setting and/or winding a clock at each lock location; the inability to identify individual keys or other user identification means and other problems. The present invention was designed to overcome these deficiencies.

It is an object of the present invention to provide a microprocessor-based electronic lock system which contains no moving parts, except for those included in the lock and the switches coupled to it and the telephone relay thereby providing for high reliability.

It is yet another object of the present invention to provide a microprocessor-based electronic lock system which is totally automatic and eliminates the need for the mailing of hard copy reports of lock operations, by use of an automatic telephone answering capability, so that the central processor may sequentially interrogate the remote locks.

It is a further object of the present invention to provide an electronic lock system which is automatic, and which does not involve employees in the reporting process.

It is yet a further object of the present invention to provide an electronic lock system which may be directly compatible with existing locks, and which permits the monitoring of vital system parameters at each lock location.

In accordance with the present invention, an electronic lock system includes a lock which is selectively lockable and unlockable in response to an input signal, for example the insertion of a proper key, the insertion of an optically-readable identification card, the pressing of the input switches in the correct sequence, or the like. Buffer means are provided for receiving these user commands, and for generating an input signal only in response to one or more preselected user commands i.e., the use of a proper key, etc. The buffer means identify certain parameters incident to the locking or unlocking of each such lock, and transmit these parameters. A series of remote microprocessors each includes a random access memory coupled to the buffer means for recording these parameters. A central processor is capable of selectively interrogating these remote microprocessors and recording these parameters. An interface is coupled between the microprocessors and the central processor for transmitting these parameters from the microprocessor memory to the central processor memory in response to this interrogation. Multiple locks may be coupled to one remote microprocessor.

BRIEF DESCRIPTION OF THE DRAWING

These and other objects and features of the present invention will best be described by reference to a presently-preferred, but nonetheless illustrative, embodiment of the present invention as shown in the accompanying drawing, in which:

FIG. 8 and 9 are schematic representations of the circuitry which form a part of the interface between the central processor and the remote microprocessor.

DETAILED DESCRIPTION OF THE DRAWING

Figure 1:
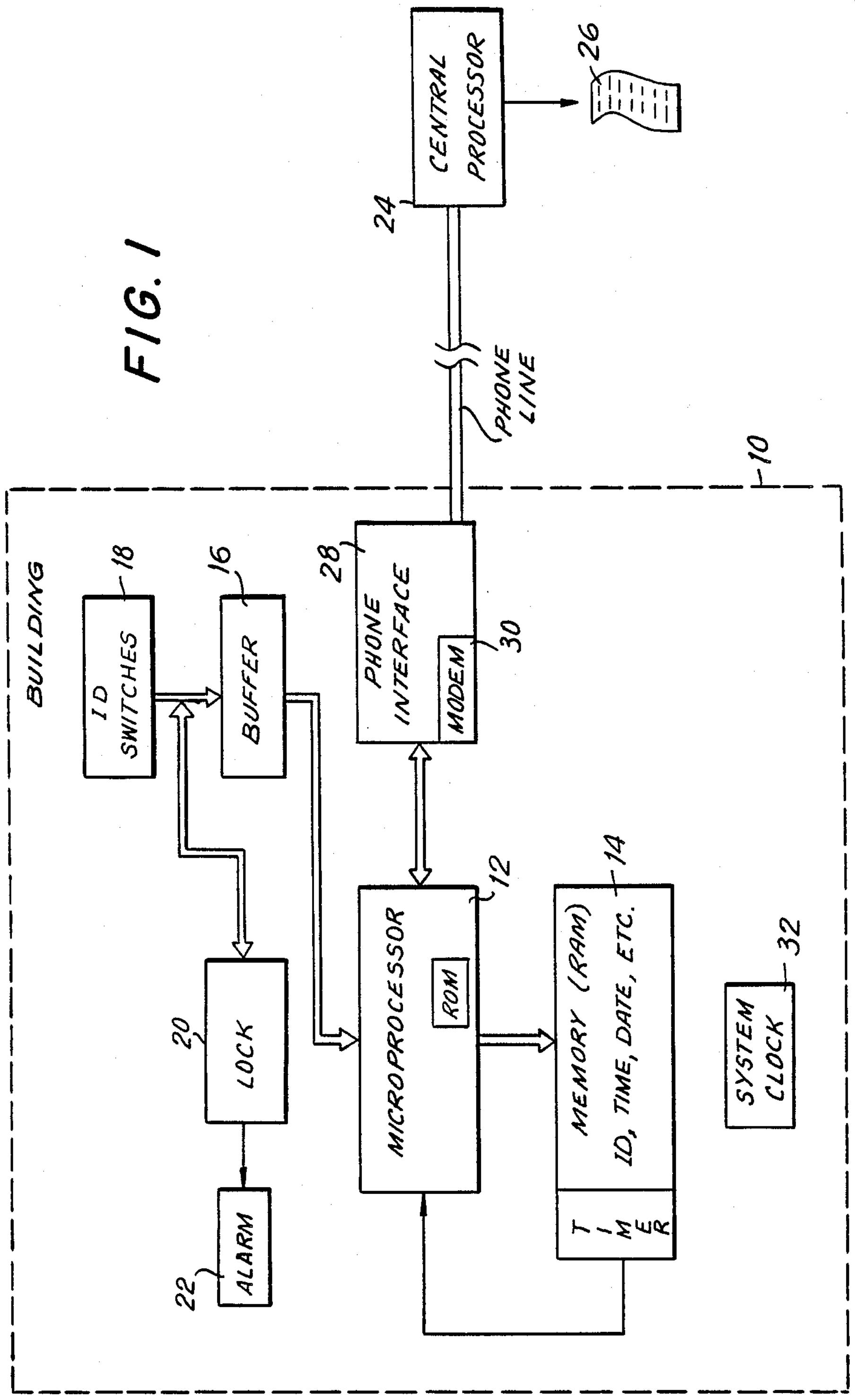
FIG. 1 is an overall diagrammic representation of the present invention including one remote location interfacing with the central processor.

Turning to the drawing, and in particular, to FIG. 1, an electronic lock system in accordance with the present invention is generally designated by the reference numeral 10. Electronic lock system 10 includes a microprocessor 12 which includes a built-in read only memory (ROM). Microprocessor 12 is coupled to microprocessor compatible memory, for example random access memory (RAM) 14 or an EEPROM.

Buffer 16 provides the interface between the user commands, for example, as encoded through identification switches 18, and microprocessor 12. Identification switches 18 also communicate with lock 20. When the facility is closed, the alarm is set at alarm location 22.

Central processor 24 is remote from electronic lock system 10, includes a random access memory, and is capable of generating reports 26. The interface between microprocessor 12 and central processor 24 is made by interface circuitry 28 which includes modem 30. The functions of microprocessor 12 and related circuitry are synchronized by system clock 32.

The internal working operations of the several integrated circuit devices shown in the following figures are described in detail in the product literature covering the same, do not form part of the present invention, and will not be discussed except as specifically relevant.

Figure 2:
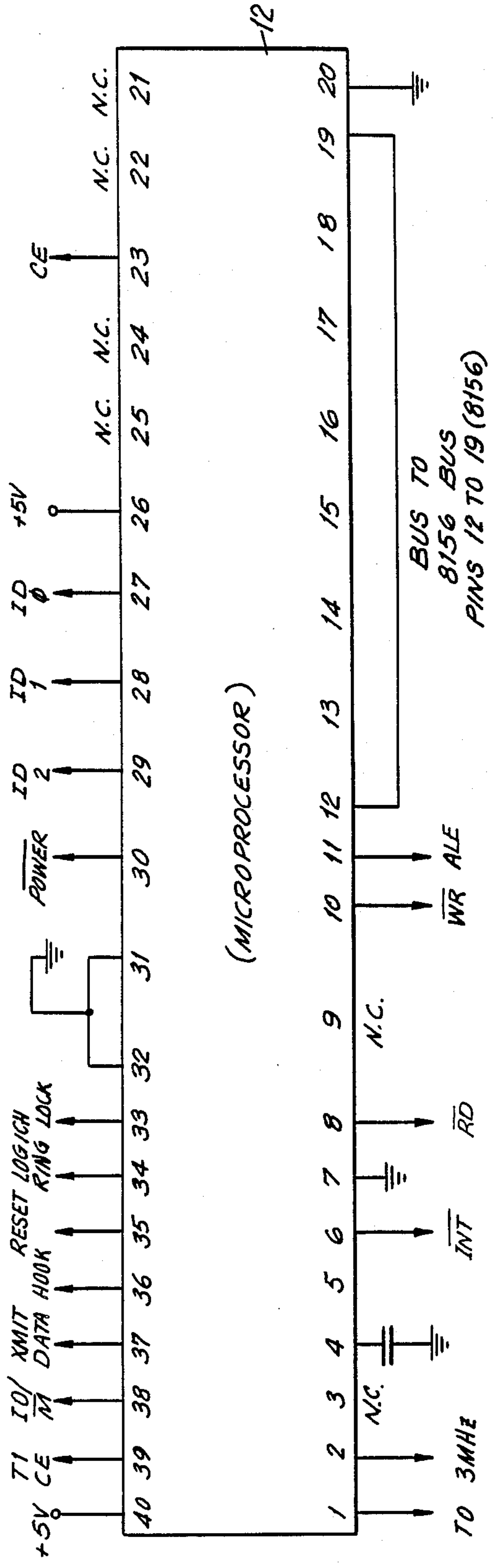
FIG. 2 is a diagrammic representation of the pin connections of a remote microprocessor.

Turning to FIG. 2, microprocessor 12 is a single component 8-bit microcomputer, for example, an Intel 8048/8748, or the equivalent.

Pins 1, 8, 10, 11, 23, 35, 38 and 40 are coupled to RAM 14 as indicated by the notations adjacent these pin connections. Pin 12 to 19 form a bus which is a bidirections port coupling the microprocessor 12 to RAM 14, thus forming the data interface between these two devices, Data may be read or written between microprocessor 12 and RAM 14 using the RD and WR strobe signals.

Figure 4:
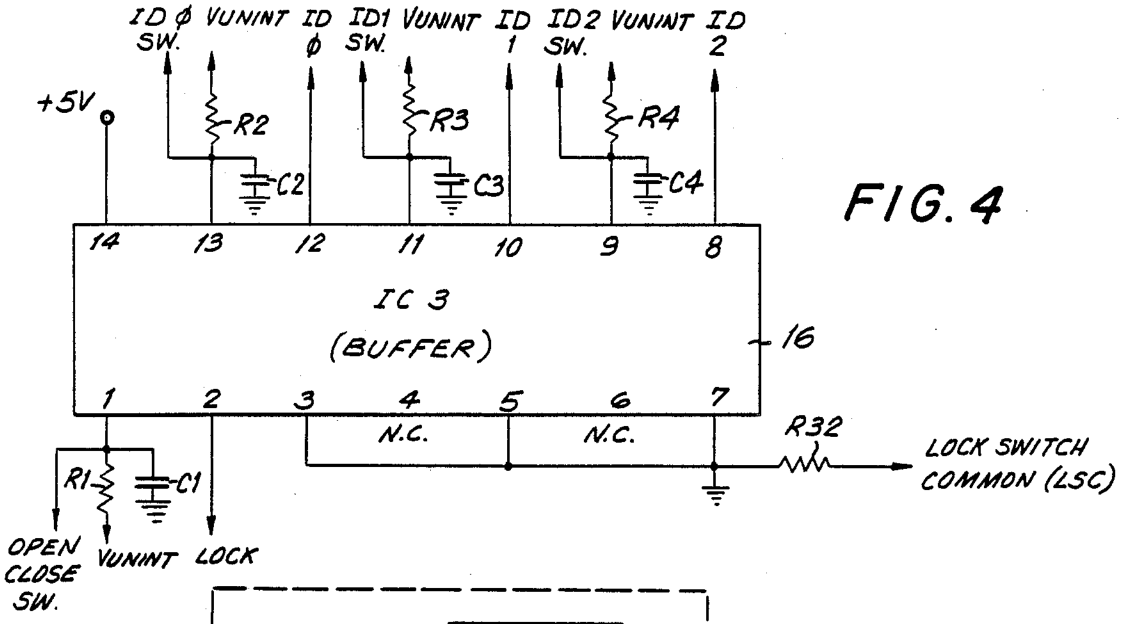
FIG. 4 is a schematic representation of the pin connections of a buffer means.
Figure 4A:
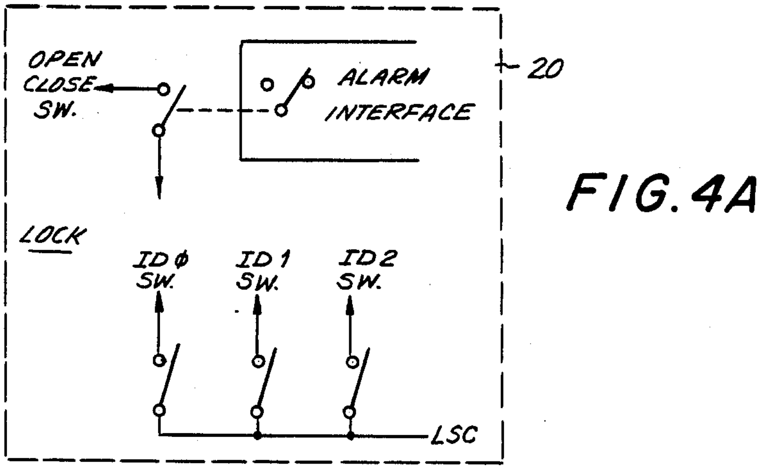
FIG. 4*a* is a schematic representation of a lock.
Figure 5:
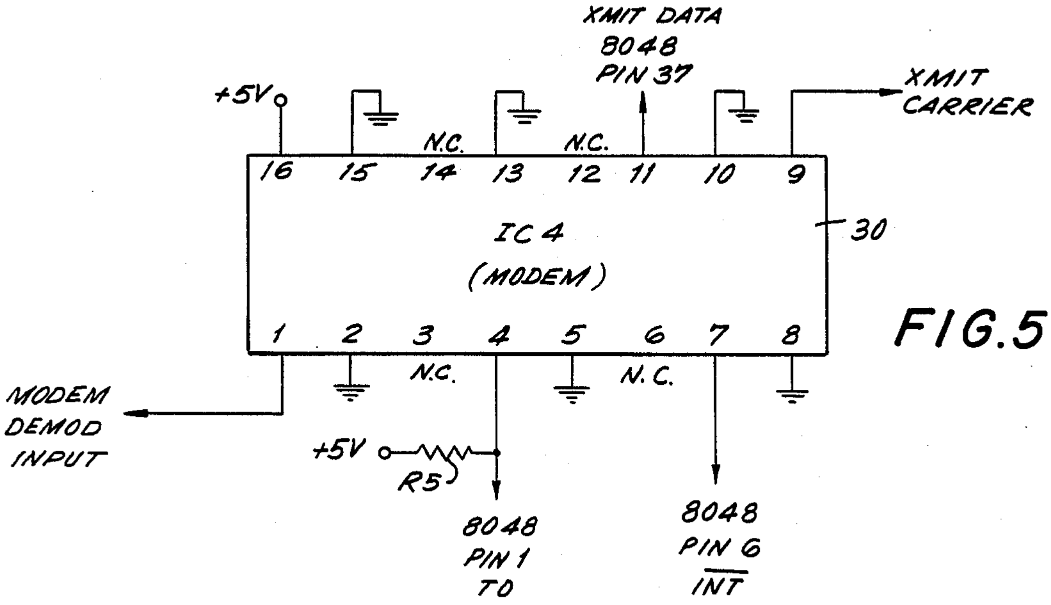
FIG. 5 is a diagrammatic representation of the pin connections of the modem which forms a part of the central processor/remote microprocessor interface.
Figure 6:
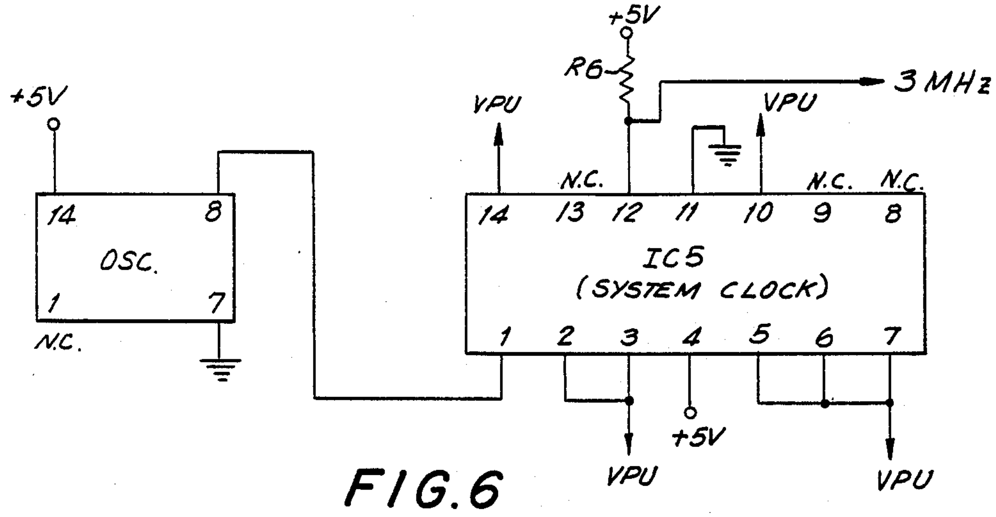
FIG. 6 is a schematic representation of the system lock and associated oscillator.

Pins 27, 28 and 29 of microprocessor 12 are coupled to identification switches ID0, ID1 and ID2 as shown in detail in FIG. 4*a*. Pin 30 is coupled to the power output of the power supply shown in FIG. 7; pin 33 is coupled to pin 2 of buffer 16 as shown in FIG. 4; pin 34 is coupled to the logical ring output of the telephone supervision circuitry of FIG. 9, and pin 36 is couplled to the hook input of Q1 as also shown in the telephone supervision circuitry of FIG. 9. Pin 37 is coupled to pin 11 of modem 30 as shown in FIG. 5. The 3MHZ signal at pin 2 is generated by the system clock as shown in FIG. 6.

Microprocessor 12 transfers to RAM 14, for subsequent interrogation, the parameters which are received from buffer 16, and subsequently retrieves the same and transmits them through telephone interface circuitry 28 upon interrogation by central processor 24.

Figure 3:
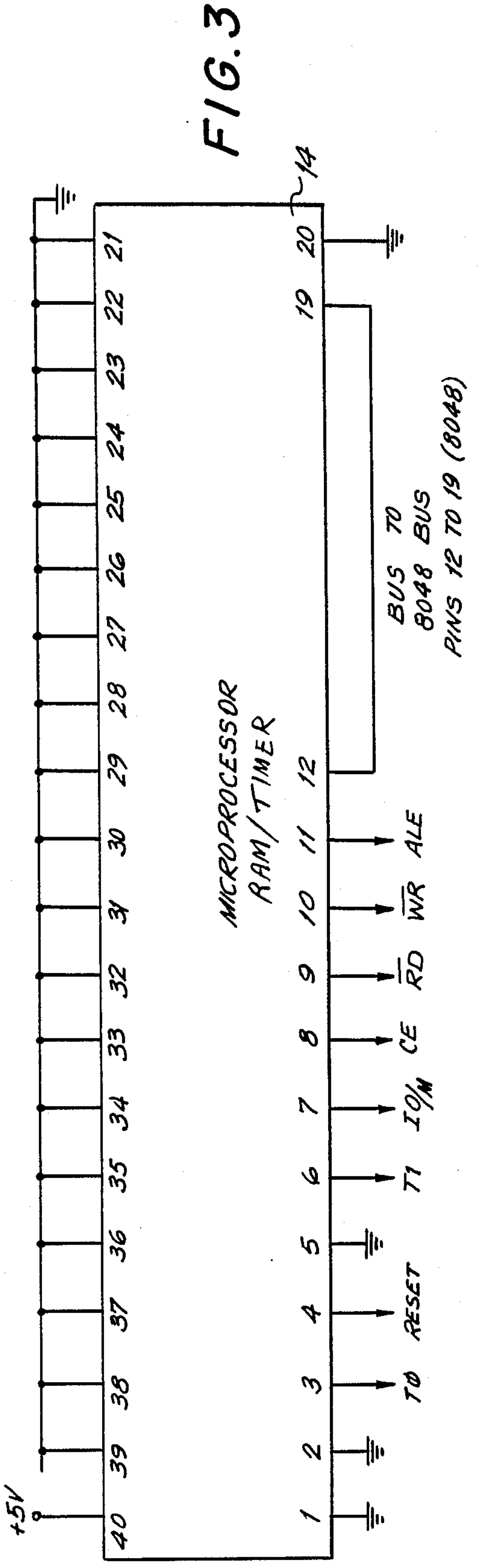
FIG. 3 is a diagrammatic representation of the pin connections of a mircoprocessor random access memory.

Turning to FIG. 3, RAM 14 may be an Intel 8156 RAM with input-output ports and timer, or the equivalent. Pins 3, 4 and 6–11 are coupled to pin locations or microprocessor 12 as indicated by the notation adjacent the pin locations, and pins 12–19 form the data bus to microprocessor 12.

Turning to FIG. 4, the buffer between the identification switches and microprocessor 12 is formed by buffer 16 which may be a National 74C914 or the equivalent.

Pin 1 is coupled both to the open/close switch of lock 20 as shown in FIG. 4*a*, and to the Vunint output of the power supply. Pin 2 is coupled to the lock shown in FIG. 4*a;* pins 3, 5 and 7 are coupled to the lock switch common (LSC) line of FIG. 4*a;* pins 8, 10 and 12 are coupled to pins 29, 28 and 27 respectively of microprocessor 12 and transmit to microprocessor 12 the information which has been provided to buffer 16 through pins 9, 11 and 13 which are coupled to ID switches 2, 1 and 0 as shown in FIG. 42.

Turning to FIG. 4*a*, the ID switches, 2, 1 and 0 identify which exployee's key was used to open the lock, and this information is transmitted to buffer 16 and then to microprocessor 12 as described above. The open/close switch identifies the lock status (i.e. open or closed).

The interface between microprocessor 12 and central processor 24 is created by the modem 30 in combination with the telephone circuitry shown in FIGS. 8 and 9.

Turning to FIG. 5, modem 30 may be a Motorola MC14412VP model, or equivalent. Pin 1 of modem 30 is coupled to modem demodulator input of the circuits shown in FIG. 8; pins 4, 7 and 11 are coupled to pins 1, 6 and 11 of microprocessor 12, and pin 9 is coupled to the Xmit Carrier input of the modem analog circuitry shown in FIG. 8.

Figure 7:
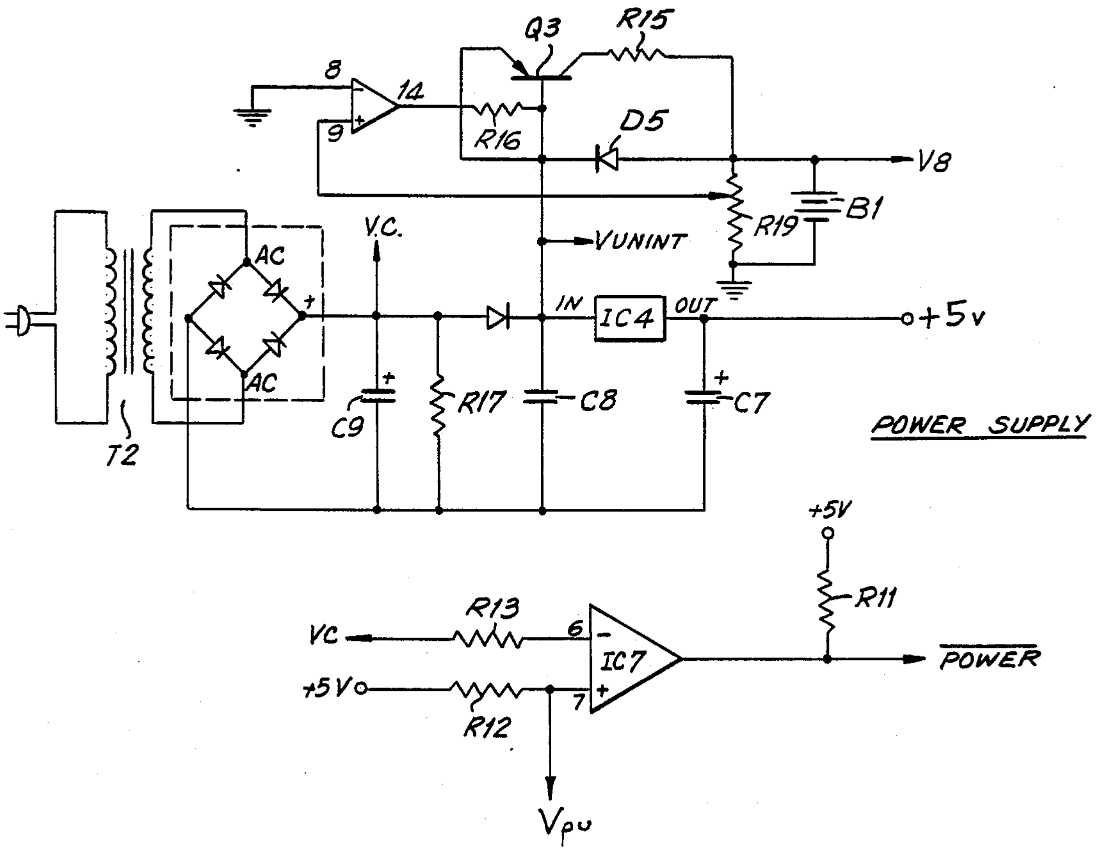
FIG. 7 is a schematic representation of the power supply for a remote microprocessor.

FIG. 6 shows the conventional system clock arrangement, and FIG. 7 describes the conventional power supply circuitry.

Turning to FIG. 8, the required input to modem 30 is generated by a series of operational amplifiers 40 and 42 which may be Motorola 324 or equivalent.

The output of operational amplifier 42 is passed through a bandpass filter, which may be a TRW UTC CCF-542 or equivalent, and thence into quad comparators 46, 48 which may be Motorola 339 quad comparators or equivalent. The output of comparator 48 is coupled to pin 1 of modem 30.

FIG. 9 shows the conventional telephone supervision circuitry, which actually engages and disengages the telephone lines in accordance with the commands of microprocessor 12, the most relevant connections of which are the connection of the logical ring line to pin 34 of microprocessor 12 and the hook line to pin 36 of microprocessor 12.

| | |
|---|---|
| R12,R13,R24,R30,R31 | 10K |
| R27 | 620 |
| R32 | 100 |
| (The following fixed resistors are ¼ Watt, +/− 1% tolerance) | |
| R10 | 1200 |
| R19,R20 | 499 |
| R25,R26 | 22.1K |
| (The following variable resistor is 10 turn, +/− 20% tolerance) | |
| R14 | 50K |
| (The following capacitors are electrolytic, +/− 10% tolerance unless otherwise noted) | |
| C1–C4 | 1 F, 35 volts, tantalum +/− |
| C7,C8,C10,C11 | 10% |
| C5,C14 | 20 F, 10 volts |
| C6 | 22 F, 10 volts |
| C9 | 2200 F, 25 volts |
| C12,C13 | 100 F, 6 volts |
| C16 | 20 F 25 volts |
| Filter | TRW/UTC CCF-542 or equivalent |
| Oscillator | MF Electronics 5406-6M or equivalent |
| Relay | Fifth Dimension W1725-5-5 |
| Opto | Opto couple type 4N32 |
| T1 | Microtran T5115 or equivalent |
| T2 | PCmount 12 VRMS at 600 mA secondary 100 v RMS 60 Hz primary |
| B1 | 12 V Gamp-hr, Gel type-Powersonic PS1250 or equivalent |
| Heat sink for IC6 | Staver V1-3 or equivalent |

The values of the several components shown in the accompanying drawing are listed for illustrative purposes in the Table 1, but may be varied depending for example, on the use of different integrated circuit components, as would be well understood to those skilled in the art.

TABLE I

| COMPONENT | TYPE OR VALUE |
|---|---|
| IC1 | Intel 8048/8748 |
| IC2 | Intel 8156P |
| IC3 | National 74C914N |
| IC4 | Motorola MC14412VP |
| IC5 | 74LS73N |
| IC6 | 7805A, 5 Volt Regulator 5% |
| IC7 | National LM 339 |
| IC8 | National LM 324 |
| Q1 | 2N 4124 |
| Q2 | 2N 2218 |
| Q3 | 2N 4126 |
| D1–D6 | 1N 4001 |
| Bridge | 4-1N4001 rectifiers or 1-50 v, 1 Amp, bridge rectifier |
| (The following fixed resistors are ¼ Watt, +/− 5% tolerance) | |
| R1–R5,R15,R17 | 22K |
| R6–R21 | 1K |
| R7,R8, R11,R16,R18 | 2.7K |
| R9,R28,R29 | 1 M |

In operation, input information (for example, the actuation of ID switches 0, 1 and 2 which identify the user and whether the lock is open or closed) transmitted to buffer 16 through ID switches 18, into microprocessor 12. Microprocessor 12 stores several parameters including the user identification, the time, day, interface status, power status, locking and unlocking status in RAM 14. Upon interrogation by central processor 24, through telephone interface circuitry 28 which controls modem 30, microprocessor 12 is interrogated, and upon proper command, the parameters stored in RAM 14 are transmitted through microprocessor 12, phone interface circuitry 28 and modem 30 to central processor 24, where the same may be used to generate reports 26. Multiple interrogators of multiple lock locations are possible.

It will be apparent to those skilled in the art that various modifications and improvements to the foregoing invention may be made without departing from the spirit and scope thereof.

What is claimed is:

1. An electric lock system comprising a central processor, a selectively lockable and unlockable lock located remotely from the central processor, a local processor located proximate the lock and remotely from the central processor, means coupled to the lock and the local processor for providing information to the local processor identifying the occurrence of a locking and an unlocking of the lock, the local processor including means for counting the time of day and memory means for storing the locking and unlocking information together with the time of day that the respective locking and unlocking occurred, the local processor causing information identifying each occurrence of the locking and unlocking of the lock to be recorded in the memory means together with the time of day the locking and unlocking occurred, and means for selectively coupling the central processor and the local processor under control of the central processor, the central processors automatically causing the coupling means to couple the central processor and the local processor and causing the local processor to transmit the stored information identifying the locking and unlocking occurrences and their associated times of day to the central processor.

2. An electronic lock system in accordance with claim 1 wherein the lock is selectively locable and unlockable in response to an input signal, and wherein the means providing locking and unlocking information to the local processor comprises buffer means for receiving user commands and generating said input signal only in response to one or more preselected user commands.

3. An electronic lock system in accordance with claim 2, wherein said user commands are encoded on a magnetic identification card, and said buffer means includes a reader capable of decoding said magnetic identification card.

4. An electronic lock system in accordance with claim 2, wherein said buffer means includes a key pad comprising a series of switches for receiving user commands.

5. An electric lock system in accordance with claim 2, wherein said buffer means identifies certain parameters incident to the locking and unlocking of the lock and transmits these parameters to the local processor, the parameters including one or more of interface status, power status, and user identification.

6. An electronic lock system in accordance with claim 2, wherein said central processor further includes means for generating and storing reports based on said parameters.

7. An electric lock system in accordance with claim 1 wherein the information of the occurrences of the locking and unlocking of the lock and their associated times of day are transmitted to the central processor in binary coded decimal form.

8. An electronic lock system in accordance with claim 1 comprising at least one other selectively lockable and unlockable lock located remotely from the central processor and remotely from said lock, another said local processor located proximate thereto and another said information providing means coupled to the other lock and the another local processor, the coupling means coupling the central processor and the another local processor and causing the another local processor to transmit information stored in its memory means identifying the locking and unlocking occurrences of the other lock and their associated times of day to the central processor.

* * * * *